United States Patent
Olabiyi et al.

(10) Patent No.: US 11,836,452 B2
(45) Date of Patent: *Dec. 5, 2023

(54) MULTI-TURN DIALOGUE RESPONSE GENERATION USING ASYMMETRIC ADVERSARIAL MACHINE CLASSIFIERS

(71) Applicant: Capital One Services, LLC, McLean, VA (US)

(72) Inventors: Oluwatobi Olabiyi, Arlington, VA (US); Erik T. Mueller, Chevy Chase, MD (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/114,567

(22) Filed: Feb. 27, 2023

(65) Prior Publication Data

US 2023/0206009 A1    Jun. 29, 2023

Related U.S. Application Data

(63) Continuation of application No. 17/003,350, filed on Aug. 26, 2020, now Pat. No. 11,663,419, which is a
(Continued)

(51) Int. Cl.
*G06F 40/35*      (2020.01)
*G06F 40/47*      (2020.01)
(Continued)

(52) U.S. Cl.
CPC .......... *G06F 40/35* (2020.01); *G06F 18/2185* (2023.01); *G06F 40/20* (2020.01);
(Continued)

(58) Field of Classification Search
CPC .......... G06F 18/2185; G06F 18/24133; G06F 40/20; G06F 40/35; G06F 40/47;
(Continued)

(56) References Cited

U.S. PATENT DOCUMENTS 10,311,877 B2   6/2019   Lee et al.
11,087,170 B2   8/2021   Malaya
(Continued)

OTHER PUBLICATIONS

Fuwei Cui, NPL Doc: "A Survey on Learning-Based Approaches for Modeling and Classification of Human-Machine Dialog Systems," Date of publication Apr. 27, 2020, IEEE Transactions on Neural Networks and Learning Systems, vol. 32, No. 4, Apr. 2021, pp. 1418-1428.*
(Continued)

*Primary Examiner* — Omar S Ismail
(74) *Attorney, Agent, or Firm* — Banner & Witcoff, Ltd.

(57) ABSTRACT

In a variety of embodiments, machine classifiers may model multi-turn dialogue as a one-to-many prediction task. The machine classifier may be trained using adversarial bootstrapping between a generator and a discriminator with multi-turn capabilities. The machine classifiers may be trained in both auto-regressive and traditional teacher-forcing modes, with the generator including a hierarchical recurrent encoder-decoder network and the discriminator including a bi-directional recurrent neural network. The discriminator input may include a mixture of ground truth labels, the teacher-forcing outputs of the generator, and/or noise data. This mixture of input data may allow for richer feedback on the autoregressive outputs of the generator. The outputs can be ranked based on the discriminator feedback and a response selected from the ranked outputs.

20 Claims, 8 Drawing Sheets

Related U.S. Application Data continuation of application No. 16/997,090, filed on Aug. 19, 2020.

(51) Int. Cl.
| | | |
|---|---|---|
| *G06F 40/20* | (2020.01) | |
| *G06N 3/088* | (2023.01) | |
| *G06F 18/21* | (2023.01) | |
| *G06N 3/045* | (2023.01) | |

(52) U.S. Cl.
CPC ............. *G06F 40/47* (2020.01); *G06N 3/045* (2023.01); *G06N 3/088* (2013.01)

(58) Field of Classification Search
CPC ........ G06N 3/044; G06N 3/045; G06N 3/047; G06N 3/084; G06N 3/088; G06N 3/0445; G06N 3/0454; G06N 3/0472; G06N 3/08; G06K 9/6257; G06K 9/6264; G06K 9/6271
See application file for complete search history.

(56) References Cited

U.S. PATENT DOCUMENTS

| | | | | |
|---|---|---|---|---|
| 11,262,984 | B2* | 3/2022 | Svyatkovskiy | G06F 17/16 |
| 2002/0178360 | A1 | 11/2002 | Wenocur et al. | |
| 2003/0167454 | A1 | 9/2003 | Iordanov et al. | |
| 2016/0300252 | A1* | 10/2016 | Frank | G06F 21/6245 |
| 2018/0082679 | A1 | 3/2018 | McCord et al. | |
| 2018/0349605 | A1 | 12/2018 | Wiebe et al. | |
| 2018/0367484 | A1* | 12/2018 | Rodriguez | H04L 67/75 |
| 2019/0066660 | A1* | 2/2019 | Liang | G10L 15/183 |
| 2019/0103092 | A1 | 4/2019 | Rusak et al. | |
| 2019/0130903 | A1 | 5/2019 | Sriram et al. | |
| 2019/0147300 | A1 | 5/2019 | Bathen et al. | |
| 2019/0155284 | A1 | 5/2019 | Zavesky et al. | |
| 2019/0244609 | A1* | 8/2019 | Olabiyi | G06N 3/047 |
| 2019/0251360 | A1 | 8/2019 | Cricri et al. | |
| 2019/0293713 | A1 | 9/2019 | Rajski et al. | |
| 2019/0304104 | A1* | 10/2019 | Amer | G06T 13/80 |
| 2019/0304157 | A1* | 10/2019 | Amer | G06V 40/23 |
| 2019/0385019 | A1 | 12/2019 | Bazrafkan et al. | |
| 2020/0098353 | A1* | 3/2020 | Olabiyi | G06F 40/35 |
| 2020/0151222 | A1* | 5/2020 | Mannar | G06N 3/044 |
| 2020/0152184 | A1 | 5/2020 | Steedman Henderson et al. | |
| 2020/0279105 | A1* | 9/2020 | Muffat | G06N 3/08 |
| 2021/0043194 | A1* | 2/2021 | Krishnamurthy | G10L 15/22 |
| 2021/0049989 | A1* | 2/2021 | Bretan | G06F 18/2113 |
| 2021/0110266 | A1* | 4/2021 | Wang | G06N 3/045 |
| 2021/0150757 | A1* | 5/2021 | Mustikovela | G06N 3/08 |
| 2021/0158812 | A1* | 5/2021 | Wooters | G10L 15/05 |
| 2021/0181754 | A1 | 6/2021 | Cui et al. | |
| 2021/0192140 | A1* | 6/2021 | Galley | G06F 40/35 |

OTHER PUBLICATIONS

Oluwatobi O. Olabiyi,"A Persona-based Multi-turn Conversation Model in an Adversarial Learning Framework," Jan. 17, 2019, 2018 17th IEEE International Conference on Machine Learning and Applications,pp. 489-493.*

Zhen Xu,"Neural Response Generation via GAN with an Approximate Embedding Layer," Sep. 2017, Proceedings of the 2017 Conference on Empirical Methods in Natural Language Processing, pp. 617-624.*

Tom Young,"Recent Trends in Deep Learning Based Natural Language Processing," 20 Jul. 20, 2018,IEEE Computational Intelligence Magazine (vol. 13, Issue: 3, Aug. 2018),pp. 55-68.*

Jintae Kim,"Multi-Turn Chatbot Based on Query-Context Attentions and Dual Wasserstein Generative Adversarial Networks," Sep. 18, 2019, Applied Sciences , Appl. Sci. 2019, 9(18), 3908; https://doi.org/10.3390/app9183908, pp. 1-5.*

A. Lamb et al., Professor forcing: A new algorithm for training recurrent networks, arXiv:1610.09038v1 [stat.ML] Oct. 27, 2016.

T. Mikolov et al, Recurrent neural network based language model, Proceedings of the 11th Annual Conference of the International Speech Communication Association (INTERSPEECH), 2010.

D. Bahdanau et al., Neural machine translation by jointly learning to align and translate, Proceedings of International Conference of Learning Representation (ICLR), 2015.

K. Cho et al., Learning phrase representations using RNN encoder-decoder for statistical machine translation, Proceedings of International Conference of Learning Representation (ICLR), pp. 1724-1734, 2014.

A. Karpathy et al., Deep visual-semantic alignments for generating image descriptions, Conference on Computer Vision and Pattern Recognition (CVPR), 2015.

C. Xiong et al., Dynamic coattention networks for question answering, Proceedings of International Conference of Learning Representation (ICLR), 2017.

G. Hinton et al., Deep neural networks for acoustic modeling in speech recognition: The shared views of four research groups, IEEE Signal Processing Magazine, 29(3):82-97, 2012.

I. Sutskever et al., Sequence to sequence learning with neural networks, Proceedings of Advances in Neural Information Processing Systems (NIPS), pp. 3104-3112, 2014.

O. Vinyals et al., A neural conversational model, Proceedings of ICML Deep Learning Workshop, arXiv: 1506.05869v3 [cs.CL] Jul. 22, 2015.

J. Li et al., A diversity-promoting objective function for neural conversation models, Proceedings of NAACL-HLT, 2016.

I. Serban et al., Building end-to-end dialogue systems using generative hierarchical neural network models, Proceedings of The Thirtieth AAAI Conference on Artificial Intelligence (AAAI-16), pp. 3776-3784, 2016.

C. Xing et al., Hierarchical recurrent attention network for response generation, arXiv: 1701.07149, 2017.

I. Serban et al., A hierarchical latent variable encoder-decoder model for generating dialogue, Proceedings of The Thirty-first AAAI Conference on Artificial Intelligence (AAAI-17), 2017.

I. Serban et al., Multiresolution recurrent neural networks: An application to dialogue response generation, Proceedings of The Thirty-first AAAI Conference on Artificial Intelligence (AAAI-17), 2017.

I. Goodfellow et al., Generative adversarial nets, Proceedings of Advances in Neural Information Processing Systems (NIPS), 2014.

L. Yu et al., SeqGAN: sequence generative adversarial nets with policy gradient, Proceedings of The Thirty-first AAAI Conference on Artificial Intelligence (AAAI-17), 2017.

J. Li et al., Adversarial learning for neural dialogue generation, arXiv: 1701.06547, 2017.

T. Che et al., Maximum-likelihood augmented discrete generative adversarial networks, arXiv:1702.07983, 2017.

Goyal et al., Professor forcing: A new algorithm for training recurrent networks, Proceedings of Advances in Neural Information Processing Systems (NIPS), 2016.

Y. Zhang et al., Adversarial feature matching for text generation, arXiv:1706.03850, 2017.

M. Mirza et al., Conditional generative adversarial nets, arXiv:1411.1784, 2014.

S. Reed et al., Generative adversarial text to image synthesis, Proceedings of the 33rd International Conference on Machine Learning (ICML) 2016.

P. Isola et al., Image-to-image translation with conditional adversarial networks, Conference on Computer Vision and Pattern Recognition (CVPR 2017), arXiv:1611.07004v3 [cs.CV] Nov. 26, 2018.

R. Williams et al., A learning algorithm for continually running fully recurrent neural networks, Neural computation, 1 (2):270-280, 1989.

M. Luong et al., Addressing the rare word problem in neural machine translation, Proceedings of the 53rd Annual Meeting of the Association for Computational Linguistics, 2015.

A. Sordoni et al., A neural network approach to context-sensitive generation of conversational responses, Proceedings of NAACL-HLT 2015, arXiv:1506.06714v1 [cs.CL] Jun. 22, 2015.

(56) References Cited

OTHER PUBLICATIONS

L. Shang et al., Neural responding machine for short-text conversation, Proceedings of ACL-IJCNLP, pp. 1577-1586, 2015.
Y. Luan et al., LSTM based conversation models, arXiv: 1603.09457, 2016.
J. Li et al., A persona-based neural conversation model, Proceedings of the 54th Annual Meeting of the Association for Computational Linguistics, pp. 994-1003, 2016.
Shao et al., Generating long and diverse responses with neural conversational models, Proceedings of International Conference of Learning Representation (ICLR), 2017.
E. Bruni et al., Adversarial evaluation for open-domain dialogue generation, Proceedings of the 18th Annual SIGdial Meeting, 2018.
A. Kannan et al., Adversarial evaluation of dialogue models., arXiv: 1701.08198v1 [cs.CL] Jan. 27, 2017.
X. Glorot et al., Understanding the difficulty of training deep feedforward neural networks, International Conference on Artificial Intelligence and Statistics, 2010.
S. Jean et al, On using very large target vocabulary for neural machine translation, arXiv: 1412.2007v2 [cs.CL] Mar. 18, 2015.
R. Banchs et al., Movie-dic: A movie dialogue corpus for research and development, Proceedings of the 50th Annual Meeting of the Association for Computational Linguistics, pp. 203-207, 2012.
K. Papineni et al., BLEU: A method for automatic evalution of machine translation, Proceedings of the 40th Annual Meeting of the Association for Computational Linguistics, pp. 311-318, 2002.
S. Banerjee et al., An automatic metric for MT evaluation with improved correlation with human judgments, Proceedings of the ACL Workshop on Intrinsic and Extrinsic Evaluation Measures for Machine Translation and/or Summarization, 2005.

C. Lin et al., Rouge: A package for automatic evaluation of summaries, Proceedings of the Workshop on Text Summarization Branches Out, 2014.
C. Liu et al., How not to evaluate your dialogue system: An empirical study of unsupervised evaluation metrics for dialogue response generation, Proceedings of EMNLP, pp. 2122-2132, 2016.
Fuwei Cui, "A Survey on Learning-Based Approaches for Modeling and Classification of Human-Machine Dialog Systems" IEEE Transactions on Neural Networks and Learning Systems, vol. 32, No. 4, Apr. 27, 2020, pp. 1418-1428.
Oluwatobi O. Olabiyi, "A Persona-based Multi-turn Conversation Model in an Adversarial Learning Framework" 17th IEEE International Conference on Machine Learning and Applications, Jan. 17, 2019, pp. 489-493.
Zhen Xu "Neural Response Generation via GAN with an Approximate Embedding Layer" Proceedings of the 2017 Conference on Empirical Methods in Natural Language Processing, Sep. 2017, pp. 617-624.
Tom Young "Recent Trends in Deep Learning Based Natural Language Processing" IEEE Computational Intelligence Magazine, vol. 13, Issue: 3, Jul. 20, 2018, pp. 55-68.
Jason Brownlee, 2017, "What is Teacher Forcing for Recurrent Neural Networks?" (Year 2017).
Guo et al., 2019, "A New GAN-based End-to-End TTS Training Algorithm" (Year:2019).
Wu et al., 2018, "Are You Talking to Me? Reasoned Visual Dialog Generation through Adversarial earning" (Year:2018).
Kim, et al., "Multi-Turn Chatbot Based on Query-Context Attentions and Dual Wasserstein Generative Adversarial Networks," Applied Sciences, 2019, 9, 3908; doi: 10.3390/app9183908, Aug. 20, 2019, 8 pages.

\* cited by examiner

Require: A generator $G$ with parameters $\theta_G$.
Require: A discriminator $D$ with parameters $\theta_D$.
   for number of training iterations do
      Initialize $cRNN$ to zero_state, $h_0$
      Sample a mini-batch of conversations, $x = \{X_i\}_{i=1}^{N}$, $X_i = (X_1, X_2, \cdots, X_i)$ with $N$ utterances. Each utterance mini batch $i$ contains $M_i$ word tokens.
      for $i = 1$ to $N - 1$ do
         Update the context state.
$$h_i = cRNN(eRNN(E(X_i)), h_{i-1})$$
         Compute the generator output using Eq. (12) for teacher forcing.
$$P_{\theta_G}^{TF}(Y_i|, Z_i, X_i) = \{P_{\theta_G}(Y_i^j|X_{i+1}^{1:j-1}, Z_i^j, X_i)\}_{j=1}^{M_i+1}$$

Compute the generator output using Eq. (12) for autoregression.
$$P_{\theta_G}^{Auto}(Y_i|, Z_i, X_i) = \{P_{\theta_G}(Y_i^j|Y_i^{1:j-1}, Z_i^j, X_i)\}_{j=1}^{T_i}$$

Sample a corresponding mini batch of autoregressive output $Y_i$.
$$Y_i \sim P_{\theta_G}^{Auto}(Y_i|, Z_i, X_i)$$
         Sample a corresponding mini batch of teacher forcing output $\tilde{Y}_i$.
$$\tilde{Y}_i \sim P_{\theta_G}^{TF}(Y_i|, Z_i, X_i)$$
      end for
      Compute the discriminator accuracy $D_{acc}$ over $N - 1$ utterances $\{Y_i\}_{i=1}^{N-1}$ and $\{X_{i+1}\}_{i=1}^{N-1}$
      if $D_{acc} < acc_{D_{th}}$ then
         Update $\theta_D$ with gradient of the discriminator loss.
$$\sum_i [\nabla_{\theta_D} \log D(h_i, X_{i+1}) + \nabla_{\theta_D} \log(1 - D(h_i, \tilde{Y}_i))]$$
      end if
      if $D_{acc} < acc_{G_{th}}$ then
         Update $\theta_G$ with the generator's teacher forcing MLE loss only.
$$\sum_i [\nabla_{\theta_G} \log P_{\theta_G}^{TF}(\tilde{Y}_i|, Z_i, X_i)]$$
      else
         Update $\theta_G$ with both autoregressive adversarial and teacher forcing MLE losses.
$$\sum_i [\lambda_G \nabla_{\theta_G} \log D(h_i, Y_i) + \lambda_M \nabla_{\theta_G} \log P_{\theta_G}^{TF}(Y_i|, Z_i, X_i)]$$
      end if
   end for

FIG. 4B

MULTI-TURN DIALOGUE RESPONSE GENERATION USING ASYMMETRIC ADVERSARIAL MACHINE CLASSIFIERS

CROSS-REFERENCE TO RELATED APPLICATIONS

The instant application is a continuation of co-pending U.S. patent application Ser. No. 17/003,350, titled "An Asymmetric Adversarial Learning Framework for Multi-Turn Dialogue Response Generation" and filed Aug. 26, 2020, which is a continuation of co-pending U.S. patent application Ser. No. 16/997,090, titled "An Asymmetric Adversarial Learning Framework for Multi-Turn Dialogue Response Generation" and filed Aug. 19, 2020, the disclosure of which is hereby incorporated by reference in its entirety.

TECHNICAL FIELD

The present disclosure is generally related to the generation of automated responses to user input.

BACKGROUND

Computer generated responses to user input such as dialogue, images, and the like, are often limited in diversity and/or not particularly relevant to the user input. For example, computer generated responses to user input such as dialogue in conventional systems may include phrases such as "I don't know," "I'm sorry," and "I don't know what you are talking about," that are safe, limited in diversity, and not particularly relevant to the topic of the conversation.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

While advances in machine learning, especially within deep neural networks, have enabled new capacity for machines to learn behavior from repository human behavioral data, existing neural network architecture and/or methodology continue to produce computer generated responses to user input that are limited in diversity and/or not particularly relevant to the topic of the input data. Aspects described herein may address these and other problems, and generally improve the quality and capabilities of machine classifiers trained to perform classification tasks. Systems and methods described herein may use machine classifiers to perform a variety of natural language understanding tasks including, but not limited to multi-turn dialogue generation. Existing open domain neural dialogue models are known to produce responses that lack relevance, diversity, and in many cases coherence. These shortcomings stem from the limited ability of common training objectives to directly express these properties as well as their interplay with training datasets and model architectures.

In a variety of embodiments, machine classifiers may model multi-turn dialogue as a one-to-many prediction task. The machine classifier may be trained using adversarial bootstrapping between a generator and a discriminator with multi-turn capabilities. The machine classifiers may be trained in both auto-regressive and traditional teacher-forcing modes, with the generator including a hierarchical recurrent encoder-decoder network and the discriminator including a bi-directional recurrent neural network. The discriminator input may include a mixture of ground truth labels, the teacher-forcing outputs of the generator, and/or noise data. This mixture of input data may allow for richer feedback on the autoregressive outputs of the generator. The outputs can be ranked based on the discriminator feedback and a response selected from the ranked outputs.

These features, along with many others, are discussed in greater detail below.

BRIEF DESCRIPTION OF THE DRAWINGS

The present disclosure is described by way of example and not limited in the accompanying figures in which like reference numerals indicate similar elements and in which:

FIG. 4B shows a pseudocode representation of a process for training a machine classifier according to one or more aspects of the disclosure.

DETAILED DESCRIPTION

Figure 1:
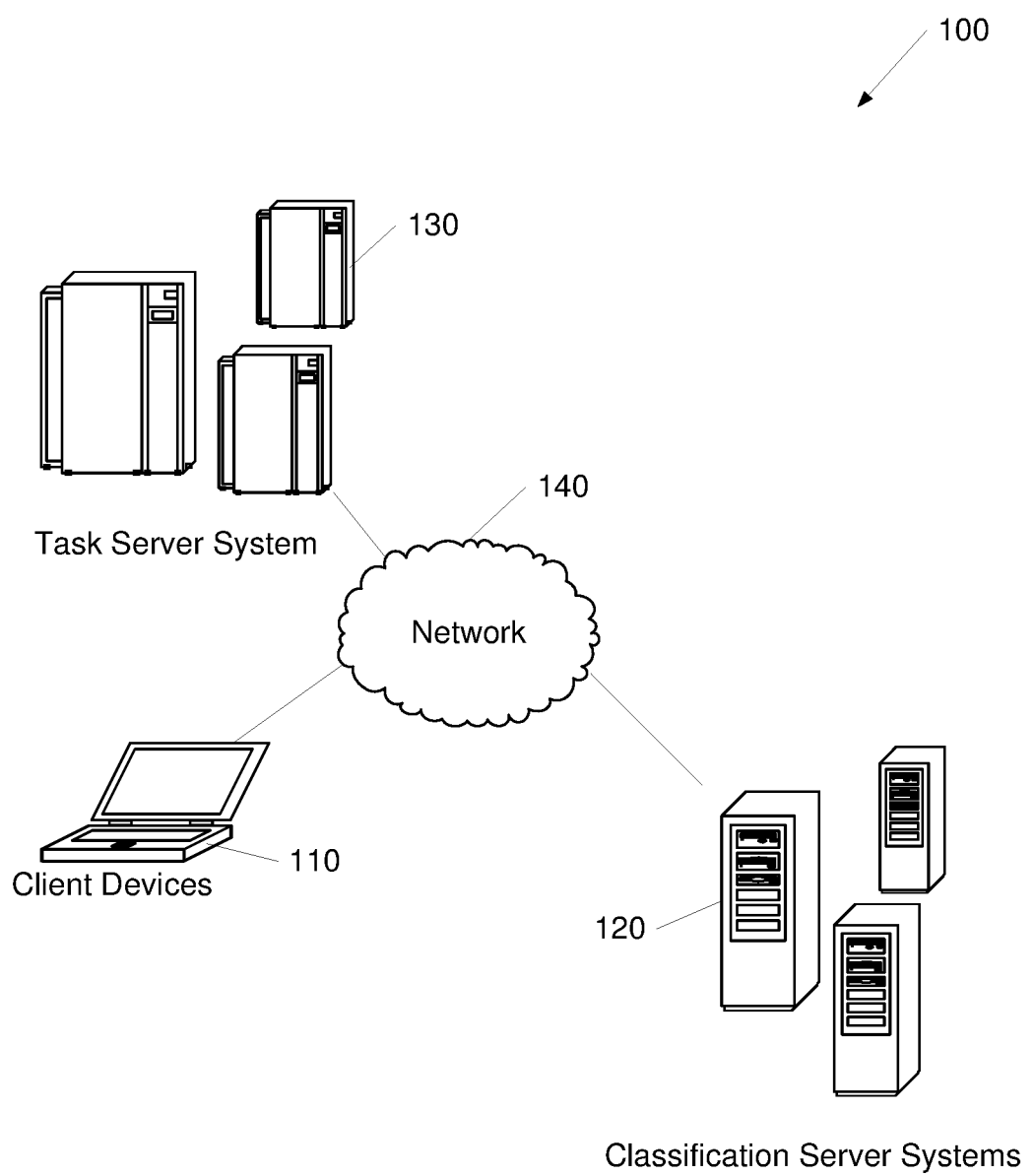
FIG. 1 shows an example of an operating environment in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for machine classifiers using adversarial learning techniques. Recent advances in deep neural network architectures have enabled tremendous success on a number of difficult machine learning problems. Deep recurrent neural networks (RNNs) in particular are achieving impressive results in a number of tasks involving the generation of sequential structured outputs, including language modeling, machine translation, image tagging, visual and language question and answering, and speech recognition. While these results are impressive, producing a neural network-based conversation model that can engage in open domain discussion remains elusive. A dialogue system needs to be able to generate meaningful and diverse responses that are simultaneously coherent with the input utterance and the overall dialogue topic. Unfortunately, earlier conversation models trained with naturalistic dialogue data suffered greatly from limited contextual information and lack diversity. These problems often lead to generic and safe utterance in response to varieties of input utterance.

Hierarchical Recurrent Encoder-Decoder (HRED) architectures are capable of capturing long temporal dependencies in multi-turn conversations to address the limited contextual information but the diversity problem remained. Some HRED variants such as variational and multi-resolution HREDs attempt to alleviate the diversity problem by injecting noise at the utterance level and by extracting additional context used to condition the generator. While these approaches achieve certain measures of success over the basic HRED, generated responses are still mostly generic since they do not control the generator's output. Similarly, diversity promoting training objectives can be used for single turn conversations, but cannot be trained end-to-end and therefore are unsuitable for multi-turn dialog modeling.

Machine classifiers in accordance with embodiments of the invention can be used to generate data based on a variety of input data, such as multi-turn dialog datasets. The machine classifiers can use a HRED architecture using generative adversarial networks (GAN) to compensate for exposure bias. A GAN matches data from two different distributions by introducing an adversarial game between a generator and a discriminator. A generator can, given an observable variable X and a target variable Y, generate a statistical model of the joint probability distribution on X×Y, $P(X,Y)$. A discriminator can generate model of the conditional probability of the target Y, given an observation x, $P(Y|X=x)$. In dialogue generation, generated responses should be consistent with the dialogue input and overall topic. Employing conditional GANs for multi-turn dialogue models with a HRED generator and discriminator combines both generative and retrieval-based multi-turn dialogue systems to improve their individual performances. This is achieved by sharing the context and word embedding between the generator and the discriminator, thereby allowing for joint end-to-end training using back-propagation.

Machine classifiers in accordance with embodiments of the invention may employ autoregressive sampling and/or use the dense conditional probability over the vocabulary as an attention over the word embedding. This can improve the performance of machine classifiers over prior art techniques that use the categorical output of the generator decoder. Machine classifiers may further backpropagate the adversarial loss through the decoder, the encoder and finally the word embedding. This complete end-to-end backpropagation alleviates the training difficulty with autoregressive sampling of combined word- and utterance-level discrimination. Further, the utterance-level discrimination can capture nuanced semantic difference between the generated response and the ground truth that might be missed by the word level discrimination. Machine classifiers may also use negative sampling in the discriminator training to further improve the quality of the adversarial weight update provided by the discriminator to the generator.

In a variety of embodiments, machine classifiers may model multi-turn dialogue as a one-to-many prediction task. A multi-turn dialog can include one or more conversation turns indicating a user utterance and a response to that utterance. In several embodiments, a conversation turn includes a variety of other metadata, such as an identification of the user and/or the responder, as appropriate to the requirements of aspects of the disclosure. The machine classifier may be trained using adversarial bootstrapping between a generator and a discriminator with multi-turn capabilities. The machine classifiers may be trained in both auto-regressive and traditional teacher-forcing modes, with the generator including a hierarchical recurrent encoder-decoder network and the discriminator including a bi-directional recurrent neural network. The discriminator input may include a mixture of ground truth labels, the teacher-forcing outputs of the generator, and/or noise data. This mixture of input data may allow for richer feedback on the autoregressive outputs of the generator. The outputs can be ranked based on the discriminator feedback and a response selected from the ranked outputs.

Operating Environments and Computing Devices

FIG. 1 shows an operating environment 100. The operating environment 100 may include at least one client device 110, at least one task server system 130, and/or at least one classification server system 120 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Client devices 110 may provide data and/or interact with a variety of machine classifiers as described herein. Classification server systems 120 may store, train, and/or provide a variety of machine classifiers as described herein. Task server systems 130 may exchange data with client devices 110, provide training data to the classification server systems 120, provide input data to the classification server systems 120 for classification, and/or obtain classified data from the classification server systems 120 as described herein. However, it should be noted that any computing device in the operating environment 100 can perform any of the processes and/or store any data as described herein. The task server systems 130 and/or classification server systems 120 may be publicly accessible and/or have restricted access. Access to a particular server system may be limited to particular client devices 110. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 140 may include a local area network (LAN), a wide area network (WAN), a wireless telecommunications network, and/or any other communication network or combination thereof.

The data transferred to and from various computing devices in operating environment 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the operating environment 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the operating environment 100 in front of one or more computing devices such that any external devices may communicate directly with the specialized hardware.

Figure 2:
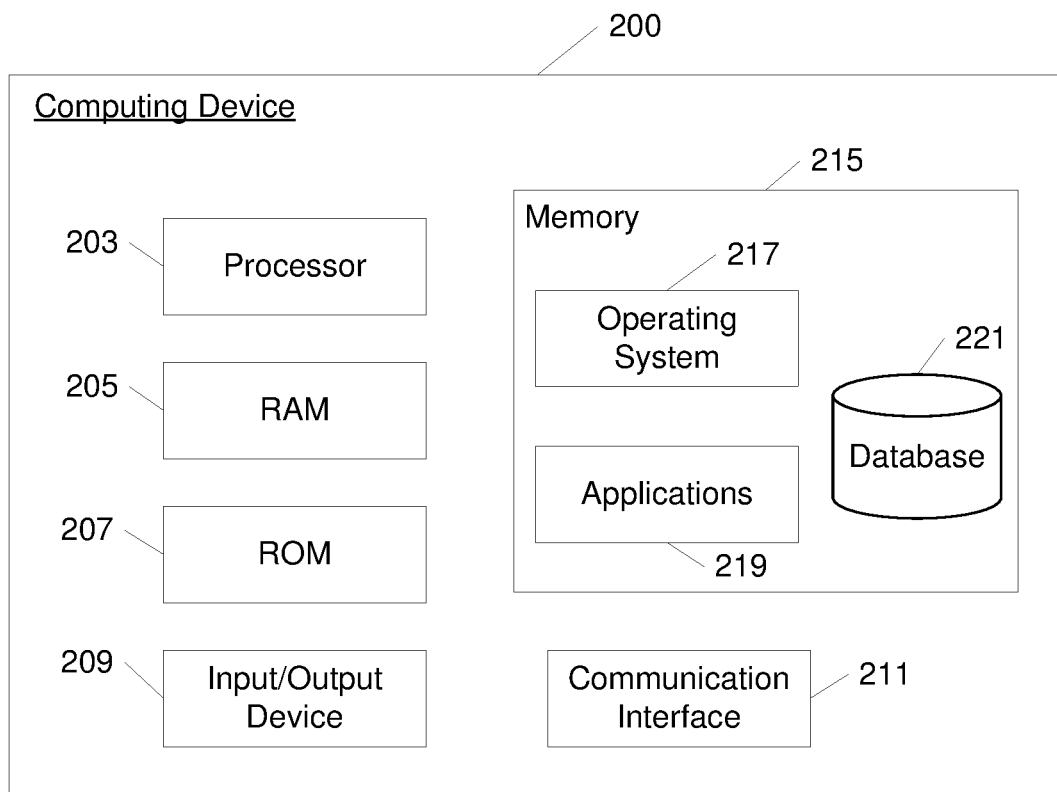
FIG. 2 shows an example computing device in accordance with one or more aspects described herein.

Turning now to FIG. 2, a conceptual illustration of a computing device 200 that may be used to perform any of the techniques as described herein is shown. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Any data described and/or transmitted herein may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 200. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 200 in front of one or more computing devices such that any external devices may communicate directly with the specialized hardware.

Machine Classifiers and Processes

Machine classifiers can make predictions for responses to a multi-turn dialog task based on previous turns in the dialog. The generator of the machine classifier can include three structures—encoder (eRNN), context (cRNN), and decoder (dRNN) neural networks. In several embodiments, these structures are based on a recurrent neural network (RNN) architecture, although any architecture can be used as appropriate. A generator can make predictions conditioned on a dialogue history $h_i$, attention $A_i^j$, noise sample $Z_i^j$, and ground truth The discriminator conditioned on $h_i$ distinguishes between the generated output $\{Y_i^j\}_{j=1}^{M_{i+1}}$ and ground truth $\{X_{i+1}^j\}_{j=1}^{M_{i+1}}$. The machine classifier can also include a discriminator. The discriminator may include a RNN architecture. The discriminator can discriminate bidirectionally at the word level. The machine classifier can also include an attention RNN. The attention RNN ensures local relevance while the context RNN ensures global relevance. Their states are combined to initialize the decoder RNN and the discriminator BiRNN.

A machine classifier being trained in an asymmetric mode may minimize the discriminator loss of the generator G based on the autoregressive outputs of the generator while the discriminator tries to maximize the discriminator loss based on the teacher forcing outputs of the generator. During training, the generator parameters may be simultaneously trained using the teacher forcing maximum likelihood estimator (MLE) and with the adversarial loss from the samples generated autoregressively. The teacher forcing MLE may set a lower bound performance with single step look ahead for the generator while the autoregressive adversarial component allows for a multi-step look ahead. The generator parameters may be shared for both teacher forcing MLE and autoregressive adversarial updates.

Figure 3A:
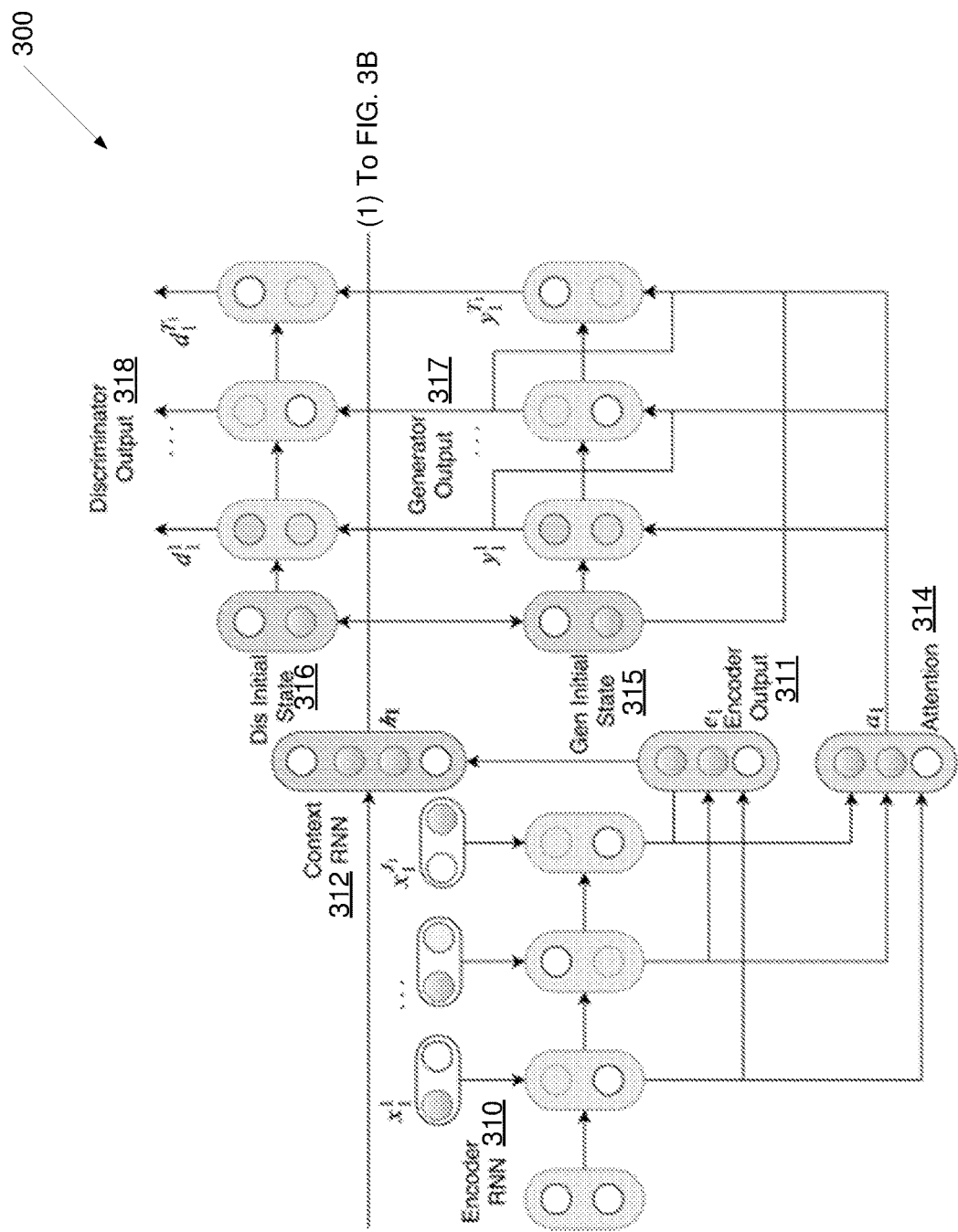
FIGS. 3A-B show an example of a generator used in a machine classifier in accordance with one or more aspects described herein.
Figure 3B:
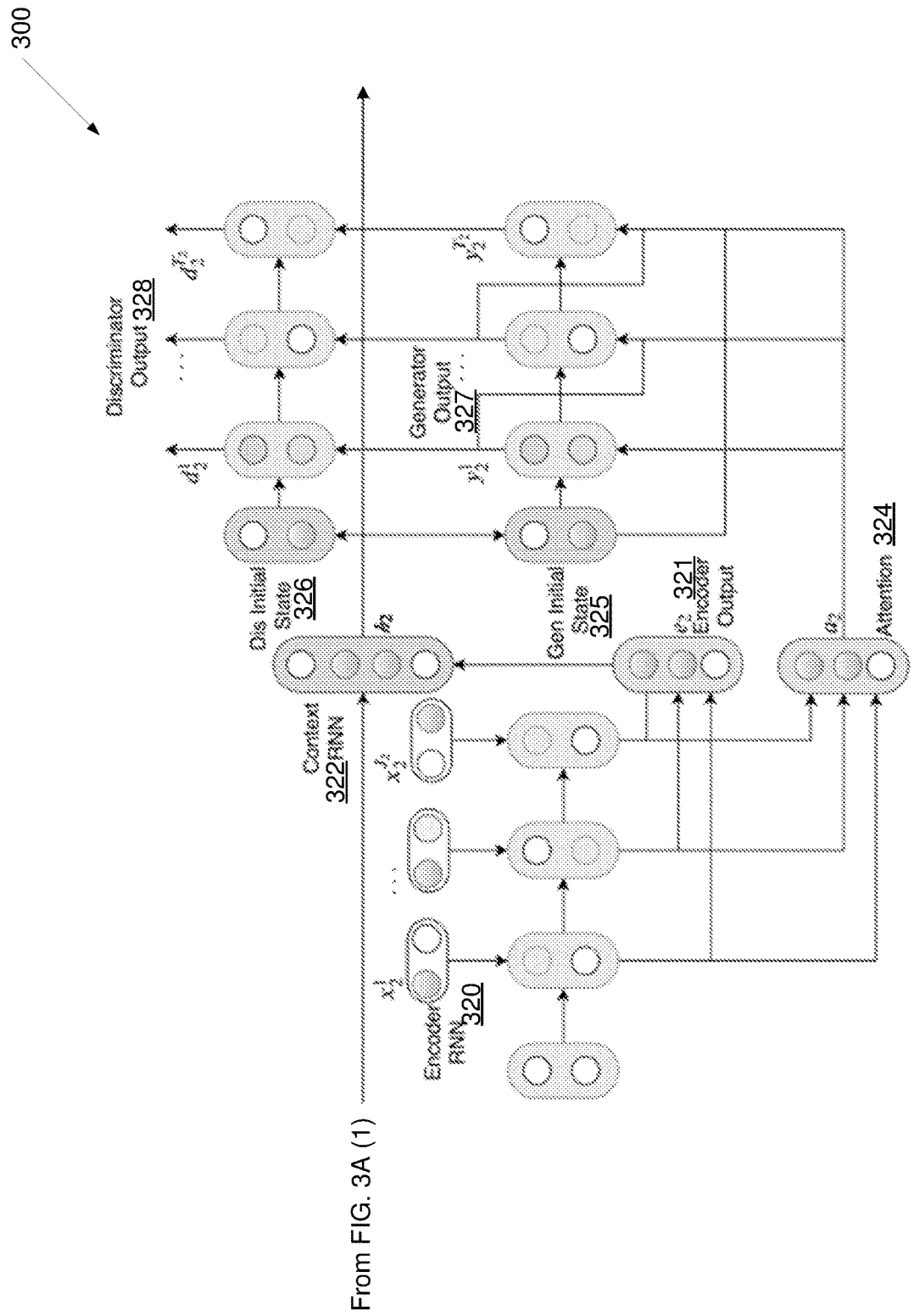

FIGS. 3A-B show an example of a machine classifier in accordance with one or more aspects described herein. The generator portion of machine classifier 300 includes four RNNs with different parameters: encoder RNN (eRNN) 310, 320, context RNN (cRNN) 312, 322, attention RNN (aRNN) 314, 324, and decoder RNN (dRNN) 316, 326. In several embodiments, aRNN 314, 324 and eRNN 310, 320 are bidirectional while cRNN 312, 322 and dRNN 316, 326 are unidirectional. Each RNN can have three layers and a hidden state size of 512. However, it should be noted that any number of layers and any hidden state size can be used as appropriate. dRNN and aRNN can be connected using an additive attention mechanism. The conditional probability $P_{\theta_G}$ modeled by the generator G per output word token can be expressed as:

$$P_{\theta_G}(Y_i^j|X_{i+1}^{1:j-1},X_i)=dRNN(E(X_{i+1}^{j-1}),h_i^{j-1},h_i)$$

where $\theta_G$ is the parameters of G, E(.) is the embedding lookup, $h_i$=cRNN(eRNN(E($X_i$), $h_{i-1}$), eRNN(.) maps a sequence of input symbols into fixed-length vector, and h and h are the hidden states of dRNN and cRNN. The conditional probability, accounting for noise samples $Z_i^j$ can be expressed as $$P_{\theta_G}(Y_i^j|\chi^{1:j-1},Z_i^j,X_i)=dRNN(E(\chi^{j-1}),h_i^{j-1},A_i^j,Z_i^j,h_i)$$

The output 311 of eRNN 310 may be used to initialize cRNN 312. The initial state 315 of the generator may be shared with the initial state 316 of the discriminator. In several embodiments, the discriminator shares context and/or word embeddings with the generator. The generator output 317 may be provided to and used by the discriminator to generate discriminator output 318. The output 321 of eRNN 320 may be used to initialize cRNN 322. The initial state 325 of the generator may be shared with the initial state 326 of the discriminator. In several embodiments, the discriminator shares context and/or word embeddings with the discriminator. The generator output 327 may be provided to and used by the discriminator to generate discriminator output 328.

The generator may be conditioned on the dialog history $h_i$, attention $A_i^j$, noise sample and one or both of the generated output $\{Y_i^j\}_{j=1}^{M_{i+1}}$ and ground truth $\{X_{i+1}^j\}_{j=1}^{M_{i+1}}$. The discriminator may be conditioned on $h_i$, and may distinguish between the generated output $\{Y_i^j\}_{j=1}^{M_{i+1}}$ and the ground truth $\{X_{i+1}^j\}_{j=1}^{M_{i+1}}$.

A variety of existing machine classifiers process high-level tokens by extracting and processing the tokens by another RNN. Machine learning classifiers in accordance with embodiments of the invention can circumvent the need for this extra processing by allowing dRNN to attend to different parts of the input utterance during response generation. Local attention can be used and the attention memory can be encoded differently from the context through aRNN, yielding:

$$P_{\theta_G}\left(Y_i^j \big| X_{i+1}^{1:j-1}, X_i\right) = dRNN\left(E\left(X_{i+1}^{j-1}\right), h_i^{j-1}, A_i^j, h_i\right)$$

where $$A_i^j = \sum_{m=1}^{M_i} \frac{\exp(\alpha_m)}{\sum_{m=1}^{M_i} \exp(\alpha_m)} h_i^{\prime m}$$

$$h_i^{\prime m} = aRNN\left(E(X_i^m), h_i^{\prime m-1}\right)$$

h' is the hidden state of aRNN 314, and $\alpha_k$ is a logit projection of, depending on implementation, either of:

$$(h_i^{j-1}, h_i^{\prime m})$$

$$(h_i^{j-1})^T \cdot h_i^{\prime m},$$

For teacher forcing mode, X=X i+1, while X=$Y_i$ for the autoregression.

Noise, such as Gaussian noise, can be injected at the input of dRNN. Noise samples can be injected at the utterance or word level. With noise injection, the conditional probability of the decoder output becomes $$P_{\theta_G}(Y_i^j|(X_{i+1}^{1:j-1}, Z_i^j, X_i) = \text{dRNN}(E(X_{i+1}^{j-1}), h_i^{j-1}, A_i^j, Z_i^j, h_i)$$

where utterance-level noise and word-level noise are, respectively:

$$Z_i^j \sim N_i(0, I)$$

$$Z_i^j \sim N_i^j(0, I)$$

Figure 3C:
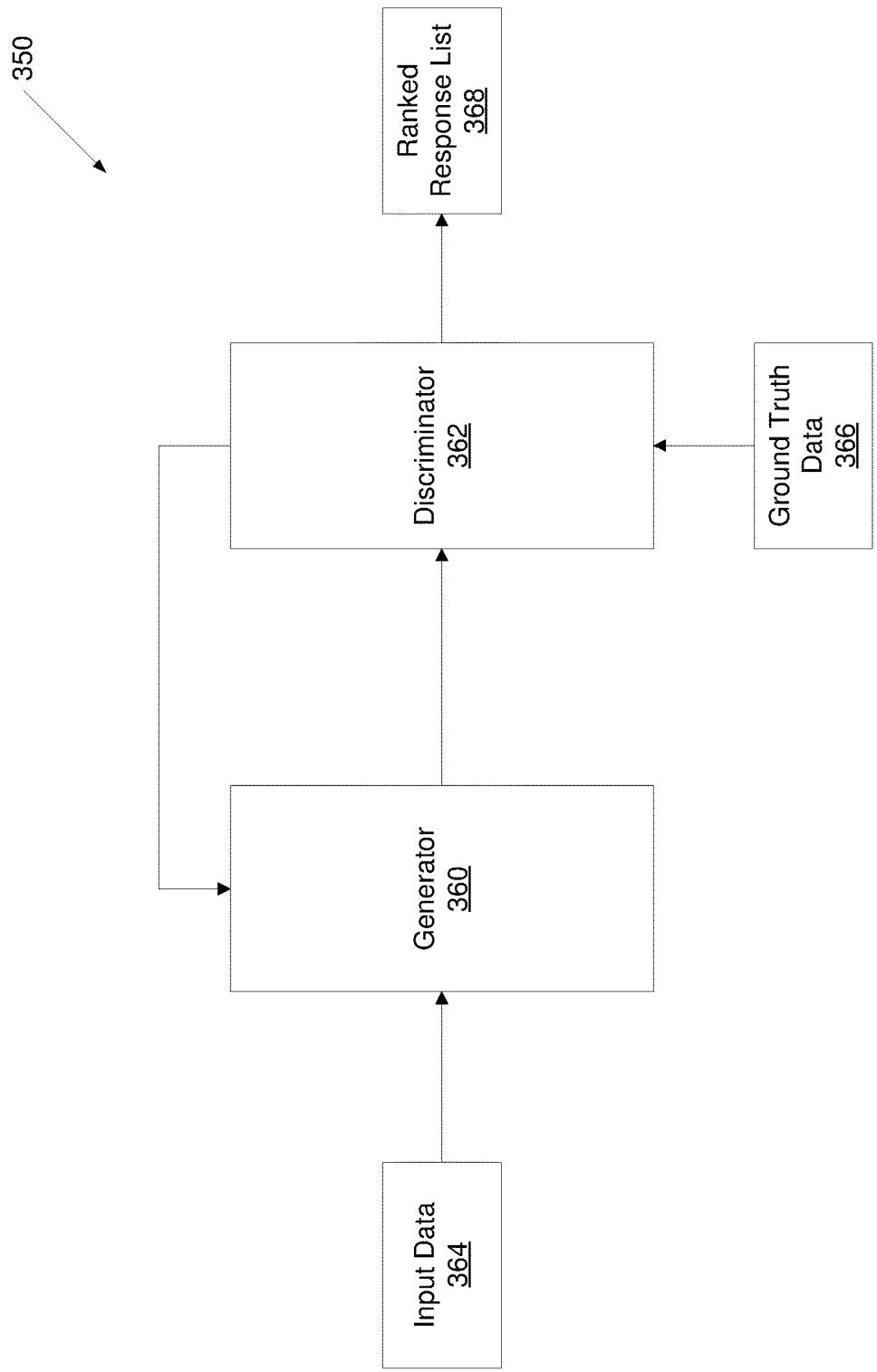
FIG. 3C shows an example of a machine learning classifier in accordance with one or more aspects described herein.

FIG. 3C shows an example of a machine classifier in accordance with one or more aspects described herein. The machine classifier 350 includes generator 360 and discriminator 362. The generator 360 can take input data 364 and generate candidate responses, which are provided to discriminator 362. Discriminator 362 can generate a probability that each candidate response corresponds to ground truth data 366. The probability generated by discriminator 362 can be used to rank the candidate responses to generate ranked response list 368. Additionally, the probabilities generated by discriminator 362 can be provided to generator 360 to autoregressively update the parameters of generator 360.

The discriminator 362 can share aRNN, eRNN, and cRNN with the generator 360. Discriminator 362 can also include a word discriminator $D_{WRNN}$. $D_{WRNN}$ can be a stacked bidirectional RNN with three layers and a hidden state size of 512, although any number of layers and hidden state size can be used as appropriate. The cRNN states can be used to initialize the states of $D_{WRNN}$. The output of both the forward and the backward cells for each word can be concatenated and passed to a fully connected layer with binary output. The output of the discriminator can include the probability that the word is from the ground truth given the past and future words.

For utterance-level discrimination, $D_{URNN}$ may be a unidirectional RNN with 3 layers and a hidden state size of 512, although any number of layers and hidden state size can be used as appropriate. $D_{URNN}$ may be initialized by the states of cRNN. The final output of the RNN may be passed to a fully connected layer with binary output. The output may be the probability that the input utterance is from the ground truth.

The discriminator 362 can share context and word embedding with the generator 360 and can discriminate at the word level. Word-level discrimination can be achieved through a bidirectional RNN and is able to capture both syntactic and conceptual differences between the generator output and the ground truth. The aggregate classification of an input sequence X can be factored over word-level discrimination and expressed as $$D(X_i, \chi) = D(h_i, \chi) = \left[\prod_{j=1}^{J} D_{RNN}(h_i, E(\chi^j))\right]^{\frac{1}{J}}$$

where $D_{RNN}(.)$ is the word discriminator RNN, $h_i$ is an encoded vector of the dialogue history $X_i$ obtained from generator 360 cRNN(.) output, and j is the jth word or token of the input sequence X. $X=Y_i$ and $J=T_i$ for the case of generator's decoder output, $X=X_{i+1}$ and $J=M_{i+1}$ for the case of ground truth, and $M_i$ is a word token in the input sequence.

While the word-level discrimination performs well at returning more syntactically informative gradient, the effectiveness of the semantic information provided to the generator might be limited as it might not capture beyond word substitutes and co-occurrence. This behavior is good for overcoming the exposure bias problem. However, the discriminator may also return gradient based on the meaning of the response beyond word substitutes and co-occurrence. This can be achieved by combining an utterance-level discrimination with the word-level discrimination, yielding a multi-resolution discrimination. The combined discriminator output can be expressed as:

$$D(X_i, \chi) = \lambda_D D_U(h_i, \chi) + (1 - \lambda_D) D_W(h_i, \chi)$$

where $\lambda_D$ is a hyperparameter, $D_U$ is a utterance-level discrimination, and $D_w$ is a word-level discrimination. In a number of embodiments, the utterance-level discrimination may be based on a convolutional neural network.

The discriminator input may be a word embedding based on the generator's output or the ground truth. To allow for end-to-end backpropagation through the generator and discriminator, the input word embeddings may be shared between the generator and the discriminator, which may be expressed as:

$$P_{\theta_G}(Y_i^j|Y^{1:j-1}, Z_i^j, X_i) = \text{softmax}(h_i^j E)$$

where $E = \mathbb{R}^{V \times n}$ is the word embedding matrix, V is the vocabulary size, and n is the embedding dimension.

Machine learning classifiers can generate a ranked list of candidate responses for input data including a multi-turn dialog sequence. A multi-turn dialogue dataset can include a sequence of N utterances $$X = (X_1, X_2, \ldots, X_N)$$

where each utterance $$X_i = (X_i^1, X_i^2, \ldots, X_i^{M_i})$$

contains a variable-length sequence of $M_i$ word tokens such that $$X_i^j \in V$$

for vocabulary V. At any time step i, the dialogue history can be expressed as:

$$X_i = (X_1, X_2, \ldots, X_i)$$

The dialogue response generation task can be defined as, given a dialogue history $X_i$, generate a response $$Y_i = (Y_i^1, Y_i^2, \ldots, Y_i^{T_i})$$

where $T_i$ is the number of generated tokens.

In order to provide realistic responses, the distribution of the responses generated by the machine classifier ($P(Y_i)$) should be indistinguishable from that of the ground truth $P(X_{i+1})$ and $T_i = M_{i+1}$. Machine classifiers can be condition response generation on dialogue history and generate dialog responses that are statistically similar to the ground truth response distributions. Machine classifiers can learn a mapping from an observed dialogue history X, and a sequence of random noise vectors $Z_i$ to a sequence of output tokens $$Y_i, G: \{X_i, Z_i\} \rightarrow Y_i$$

The generator G can be trained to produce output sequences that are statistically similar to the ground truth sequence by an adversarially trained discriminator D that is trained to do well at detecting fake sequences. The distribution of the generator output sequence can be factored by the product rule:

$$P(Y_i|X_i) = P(Y_i^1)\prod_{j=2}^{T_i} P(Y_i^j|Y_i^1, \ldots, Y_i^{j-1}, X_i)$$

$$p(Y_i^j|Y_i^1, \ldots, Y_i^{j-1}, X_i) = P_{\theta_G}(Y_i^{1:j-1}, X_i)$$

where $$Y_i^{1:j-1} = (Y_i^1, \ldots, Y_i^{j-1})$$

and $\theta_G$ are the parameters of the generator model.

The generator can use an autoregressive generative model where the probability of the current token depends on the past generated sequence:

$$P_{\theta_G}(Y_i^{1:j-1}, X_i)$$

To stabilize the training of the generator G is unstable in practice, the past generated sequence may be substituted with the ground truth:

$$P(Y_i^j|Y_i^1, \ldots, Y_i^{j-1}, X_i) \approx P_{\theta_G}(X_{i+1}^{1:j-1}, X_i)$$

In a variety of embodiments, the substitution of past-generated sequences with ground truth data in the training of a machine classifier is known as training the machine classifier using a teacher forcing mode. In several embodiments, the ground truth data can be perturbed using noise data to generate a fake sample. A fake sample can be described as the teacher forcing output with some input noise $Z_i$:

$$Y_i^j \sim P_{\theta_G}(X_{i+1}^{1:j-1}, X_i, Z_i)$$

and the corresponding real sample as ground truth $X_{i+1}^j$.

The objective function of the generator can be used to match the noise distribution $P(Z_i)$ to the distribution of the ground truth response $P(X_{i+1}|X_i)$. Varying the noise input then allows for the generation of diverse responses to the same dialogue history. Furthermore, the discriminator can used during inference to rank the generated responses, providing a means of controlling the generator output.

In several embodiments, an asymmetric configuration may be used where the teacher forcing samples are used to train the discriminator and the autoregressive output is used for the generator's adversarial updates, which may be expressed as:

$$Y_i^j \sim P_{\theta_G}(Y_{i+1}^{1:j-1}, X_i, Z_i)$$

Negative sampling can also be used to better train the discriminator, thereby providing better adversarial feedback to the generator. The objective of the generator can be expressed as $$L_{cGAN(G,D)} = \mathbb{E}_{X_i, X_{i+1}}[\log D(X_{i+1}, X_i)] + \mathbb{E}_{X_i, Z_i}[1 - \log D(G(X_i, Z_i), X_i)]$$

where generator G tries to minimize this objective against an adversarial discriminator D that tries to maximize it:

$$G^*, D^* = \arg\min_G \max_D L_{cGAN}(G, D).$$

It can be beneficial to mix the objective with a more traditional loss L such as, but not limited to, cross-entropy loss and/or maximum likelihood estimation (MLE). The discriminator's job remains unchanged, but the generator is tasked not only to fool the discriminator but also to be near the ground truth $X_{i+1}$ in the cross-entropy sense:

$$L_{MLE}(G) = \mathbb{E}_{X_i, X_{i+1}, Z_i}[-\log P_{\theta_G}(X_{i+1}, X_i, Z_i)].$$

Machine classifiers using an asymmetric adversarial learning objective may separate the optimization of the generator and the discriminator. The objective function with the addition of negative samples $X_{i+1}^-$ can be expressed as:

$$G^*, D^* = \arg\min_G \max_D (\lambda_G L_G(G, D) + \lambda_D L_D(G, D) + \lambda_M L_{MLE}(G))$$

where $\lambda_G$, $\lambda_D$, and $\lambda_M$ are training hyperparameters. In a variety of embodiments, $$L_G(G, D) = \mathbb{E}_{X_i, Z_i}[1 - \log D(Y_i, X_i)]$$

$$L_D(G, D)[\log D(X_{i+1}, X_i)] + D_{X_i, Z_i}[1 - \log D(\tilde{Y}_i, X_i)] + D_{X_i, Z_i}[1 - \log D(X_{i+1}^-, Z_i), X_i)]$$

In many embodiments, the machine classifier is trained to generate mappings from $X_i$ to $Y_i$ without nose $Z_i$. However, this can result in a trained machine classifier that produces deterministic outputs and fails to match any statistical similarity to the ground truth other than a delta function.

Machine classifiers may pass the ground truth and generator output to the discriminator with a label of 1 and 0 respectively. To improve the adversarial loss, a random sample of the input data (e.g. training data) $\tilde{X}_{i+1}$ can be provided to the discriminator with a label of 0. These negative samples may improve the feedback generated by the discriminator (and provided to the generator) by making the discrimination task more difficult. In a variety of embodiments, the inclusion of negative samples in the training of the discriminator improves the accuracy of the machine classifier by approximately 10%.

Figure 4A:
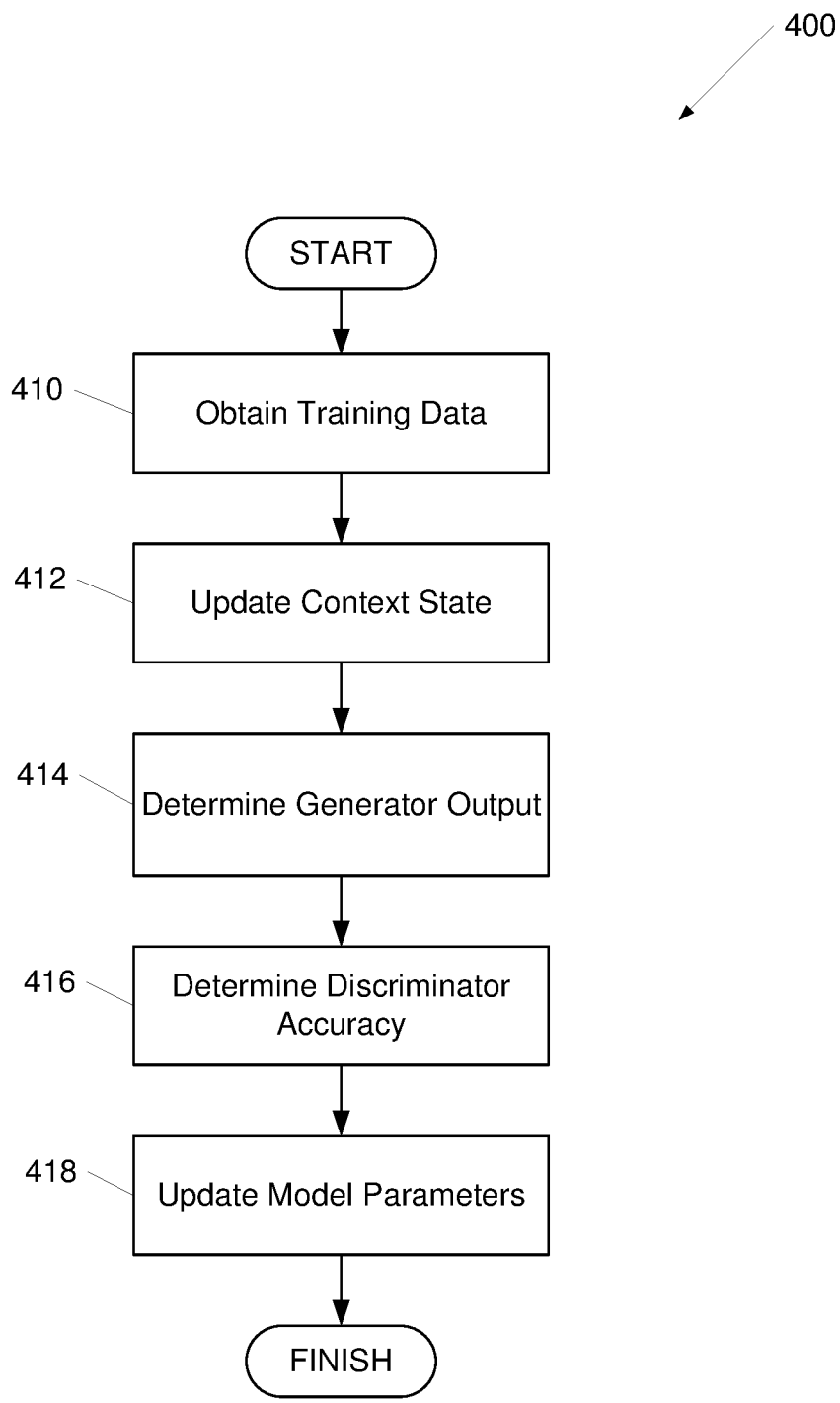
FIG. 4A shows a flow chart of a process for training a machine classifier according to one or more aspects of the disclosure.

FIG. 4 shows a flow chart of a process for training a machine classifier according to one or more aspects of the disclosure. Some or all of the steps of process 400 may be performed using one or more computing devices as described herein. In a variety of embodiments, some or all of the steps described below may be combined and/or divided into sub-steps as appropriate.

At step 410, training data can be obtained. The training data can include a number of dialog sequences in a multi-turn dialog. Each dialog sequence can include one or more word tokens. The training data can also include a current prompt to which the machine classifier is being trained to generate a response. The current prompt can include one or more word tokens indicating a statement, question, or other dialog step. The training data can also include a ground truth response to the current prompt. In several embodiments, a subset of the training data is used to train the machine classifier. The subset of training data can be randomly sampled from the training data and/or selected based on particular characteristics of certain examples in the training data. For example, if the machine classifier is being trained to identify a particular feature in input data, the examples having that particular feature may be included in the subset of training data. The training data can include both teacher forcing samples and/or autoregression data. The teacher forcing samples may correspond to particular pieces of the autoregression data. For example, the autoregression data may include an output generated by the generator for a particular input and the corresponding teacher forcing sample is the ground truth label for the input. Any selected subsets can include subsets of the teacher forcing samples, the autoregression data, and/or a combination.

At step 412, the context of the machine classifier can be updated. The context of the machine classifier can indicate the current history of a multi-turn dialog such that the current prompt to which the machine classifier is generating a response. This can allow the machine classifier to generate a relevant response (e.g. a response that is statistically similar to the ground truth response) within the context of the entire dialog, not just the current prompt. The context of the machine classifier can be updated based on a subset of the dialog sequences in the training data.

At step 414, a generator output can be determined. The generator output can be determined by a generator portion of the machine classifier. The generator output can be determined based on the context and the current prompt. In a variety of embodiments, the generator output is determined based on the current model parameters for the generator, the context, and the current prompt. The generator output can include one or more word tokens forming a response to the current prompt.

At step 416, discriminator accuracy can be determined. The discriminator accuracy can be determined by a discriminator portion of a machine classifier. The discriminator accuracy can indicate the statistical similarity between the generator output and the ground truth response to the current prompt. In a variety of embodiments, the discriminator accuracy includes a probability indicating the likelihood that the generator output is the ground truth response to the current prompt based on the context.

At step 418, model parameters can be updated. The model parameters can be updated based on the context, the current prompt, the generated response, the ground truth response, and the discriminator accuracy. By updating the model parameters, the generator can be trained to generate responses that are more accurate. In several embodiments, the model parameters are updated using an autoregression weighted by the discriminator accuracy. In a variety of embodiments, the ground truth response is injected with noise as described herein. In several embodiments, it is desirable to keep the discriminator from becoming too good at discriminating the output of the generator such that the adversarial loss is not useful to the generator. At the same time, it is desirable to keep the performance of the discriminator above a threshold level such that the loss provided to the generator is useful. To ensure the performance of the discriminator, the discriminator may only be updated when its accuracy is below a discriminator performance threshold value (e.g. $acc_{D_{th}}$), such as 0.99. When the discriminator loss is below a generator performance threshold value (e.g. $acc_{G_{th}}$), such as 0.75, the generator may be updated based on the teacher forcing MLE loss. Otherwise, the generator may be updated based on the autoregressive adversarial loss, either alone or in combination with the teacher forcing MLE loss. It should be noted that any threshold values can be used for updating the model parameters of the discriminator and/or generator as appropriate.

In a variety of embodiments, the algorithm 450 shown in FIG. 4B can be used to train a machine classifier having a generator G with parameters $\theta_G$ and a discriminator D with parameters $\theta_D$. Some or all of the steps of process 450 may be performed using one or more computing devices as described herein. In a variety of embodiments, some or all of the steps of process 450 may be combined and/or divided into sub-steps as appropriate.

Once trained, a machine classifier can be used to generate responses to a prompt in a multi-turn dialog task. The generation objective can be mathematically described as $$Y_i^* = \operatorname*{argmax}_l \{P(Y_{i,l}|X_i) + D^*(X_i, Y_{i,l})]\}_{l=1}^L$$

where $$Y_{i,l} = G^*(X_i, Z_{i,l})$$

$Z_{i,l}$ is the lth noise samples at dialogue step i, and L is the number of response samples. In a variety of embodiments, the inference objective of the discriminator is the same as the training objective of the generator, combining both the MLE and adversarial criteria. This is in contrast to existing classifiers where the discriminator is usually discarded during inference. In several embodiments, an approximate solution can be calculated for the inference objective based on greedy decoding (e.g. MLE) on the to generate L lists of responses based on noise samples $$\{Z_{i,l}\}_{l=1}^L$$

In order to facilitate the exploration of the generator's latent space, we sample a modified noise distribution, $$Z_{i,l}^j \sim \mathcal{N}_{i,l}(0, \alpha I)$$

or $$Z_{i,l}^j \sim \mathcal{N}_{i,l}^j(0, \alpha I)) \text{ where } \alpha > 1.0$$

where α is the exploration factor that increases the noise variance. The response samples L can be ranked using the discriminator score $$\{D^*(X_i, Y_{i,l})]\}_{l=1}^L$$

The response with the highest discriminator ranking can be considered as the optimum response for the dialogue context.

Figure 5:
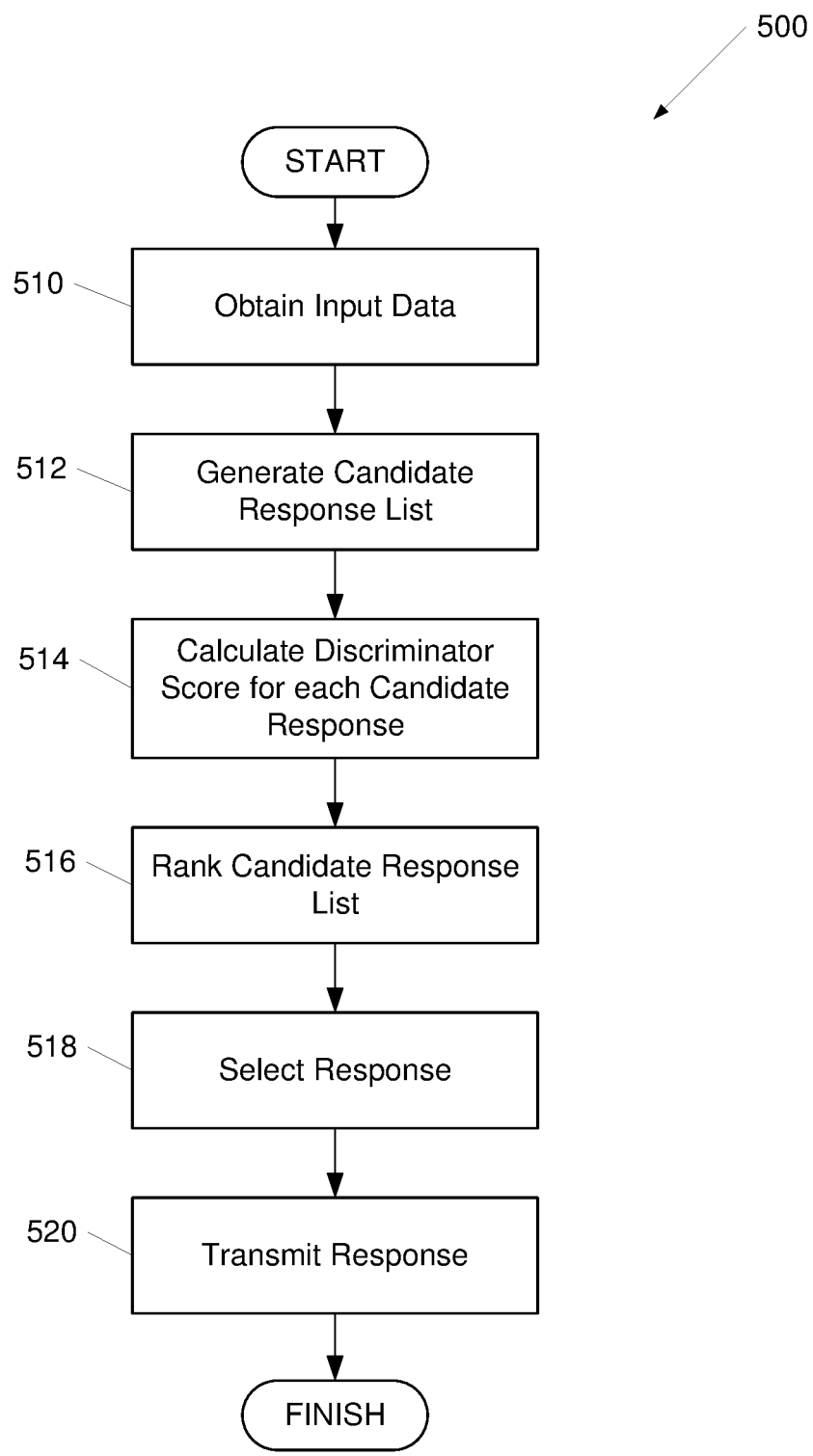
FIG. 5 shows a flow chart of a process for classifying data according to one or more aspects of the disclosure.

FIG. 5 shows a flow chart of a process for classifying data according to one or more aspects of the disclosure. Some or all of the steps of process 500 may be performed using one or more computing devices as described herein. In a variety of embodiments, some or all of the steps described below may be combined and/or divided into sub-steps as appropriate.

At step 510, input data can be obtained. The input data can include a number of dialog sequences in a multi-turn dialog. Each dialog sequence can include one or more word tokens. The input data can also include a current prompt to which the machine classifier is being asked to generate a response. The current prompt can include one or more word tokens indicating a statement, question, or other dialog step. The dialog sequences may belong to a particular class of tasks. A class of task can indicate a particular domain or other context in which a machine classifier can be trained to generate responses. For example, the input data can be the chat history for an online chat session for a customer service application, and the current prompt can indicate the last question asked by a customer. The input data can be provided to a machine classifier trained to generate responses for a particular class of task. For example, a machine classifier trained to respond to questions in a customer service context may be different from a machine classifier trained to respond to questions in a medical context.

At step 512, a candidate response list can be generated. The machine classifier can generate the candidate response list based on the dialog sequences and the current prompt. In a variety of embodiments, the machine classifier generates the response using a generator having a set of model parameters determined during the training of the machine classifier as described herein. In several embodiments, the candidate response list includes one or more candidate responses to the current prompt in the context of the dialog sequences. In a variety of embodiments, each candidate response list includes a confidence metric, calculated by the generator, indicating the likelihood that the candidate response corresponds to a ground truth response to the current prompt. At step 514, a discriminator score can be calculated for each candidate response. In many embodiments, the discriminator score for a candidate response is calculated based on the dialog sequences, the current prompt, and the candidate response. The discriminator score can be determined by a discriminator of the machine classifier. The discriminator score can indicate the statistical similarity between the candidate response and an anticipated ground truth response to the current prompt. In a variety of embodiments, the discriminator score includes a probability indicating the likelihood that the candidate response is the ground truth response to the current prompt based on the context. The ground truth response to the current prompt can indicate a response that is informative, relevant, or both. The discriminator score can be calculated for each candidate response in the candidate response list. In a number of embodiments, the discriminator score is only calculated for candidate responses having a confidence metric exceeding a threshold value.

At step 516, the candidate response list can be ranked. The candidate response list can include the set of candidate responses ordered by the discriminator score for each candidate response. At step 518, a response can be selected. In many embodiments, the selected response is the candidate response having the highest (or lowest) discriminator score. That is, the selected response is the candidate response that is indicated by the machine classifier to be closest to a ground truth response for the current prompt. At step 520, the response can be transmitted. The response can be transmitted to any computing device displaying and/or generating the input data. For example, in the customer service context, the candidate response may be transmitted as a real-time chat response in a chat window displayed using a web browser of the customer's computer. In the medical context, the response can be transmitted via email. However, any technique for transmitting and displaying responses, such as a push notification to a mobile device, can be used as appropriate.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied, in whole or in part, in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method for generating a response, comprising:
   receiving communication data comprising a plurality of dialog sequences;
   generating, by a generator of a generative adversarial network and based on context embedding and word embedding of the communication data, a plurality of responses, wherein each response in the plurality of responses comprises at least one keyword selected based on a maximum likelihood estimation of the at least one keyword in the communication data;
   ranking, by at least one discriminator of the generative adversarial network and based on the context embedding and the word embedding, the plurality of responses;
   selecting, by the at least one discriminator, an optimal response from among the ranked plurality of responses; and
   transmitting the optimal response.

2. The computer-implemented method of claim 1, wherein the generator and the at least one discriminator share the context embedding and the word embedding.

3. The computer-implemented method of claim 1, further comprising:
   generating, by an encoder and based on the communication data, the word embedding of the communication data.

4. The computer-implemented method of claim 1, further comprising:
   generating, by the generator and based on training data comprising conversation data, initial autoregression data;
   generating, by the generator and based on a set of teacher forcing samples, initial teacher forcing data; and
   determining, by the at least one discriminator and based on the initial autoregression data and the initial teacher forcing data, a discriminator accuracy.

5. The computer-implemented method of claim 1, further comprising:
   training the at least one discriminator after determining that a discriminator accuracy is below a discriminator threshold value, wherein the discriminator accuracy is determined by the at least one discriminator and based on an initial autoregression data and an initial teacher forcing data;

retraining the generator using a teacher forcing loss function of the generator after determining that the discriminator accuracy is below a generator threshold value;

retraining the generator using the teacher forcing loss function and an autoregressive loss function after determining that the discriminator accuracy is above the generator threshold value; and storing a trained generative adversarial network.

6. The computer-implemented method of claim 1, further comprising:

determining, by the at least one discriminator, a discriminator score for each response in the plurality of responses indicating a statistical similarity between the response and an anticipated ground truth response to the communication data; and ranking the plurality of the responses further based on the discriminator score for each response in the plurality of responses.

7. The computer-implemented method of claim 1, further comprising:

determining, by the at least one discriminator, a discriminator score for each response in the plurality of responses indicating a probability that the response is a ground truth response to a current prompt indicated in the communication data; and ranking the plurality of the responses further based on the discriminator score for each response in the plurality of responses.

8. The computer-implemented method of claim 1, wherein the generator comprises hierarchical recurrent encoder-decoder network.

9. The computer-implemented method of claim 1, wherein the at least one discriminator comprises a convolutional neural network.

10. The computer-implemented method of claim 1, wherein the at least one discriminator comprises a recurrent neural network.

11. A computing device for generating responses, comprising:

a processor; and a memory in communication with the processor and storing instructions that, when executed by the processor, cause the computing device to:

receive communication data comprising a plurality of dialog sequences;

generate, by the computing device comprising a generator of a generative adversarial network and based on context embedding and word embedding of the communication data, a plurality of responses, wherein each response in the plurality of responses comprises at least one keyword selected based on a maximum likelihood estimation of the at least one keyword in the communication data;

rank, by the computing device comprising at least one discriminator of the generative adversarial network and based on the context embedding and the word embedding, the plurality of responses;

select, by the at least one discriminator, an optimal response from among the ranked plurality of responses; and transmit the optimal response.

12. The computing device of claim 11, wherein the generator and the at least one discriminator share the context embedding and the word embedding.

13. The computing device of claim 11, wherein the instructions, when read by the processor, further cause the computing device to:

generate, by an encoder and based on the communication data, the word embedding of the communication data.

14. The computing device of claim 11, wherein the instructions, when read by the processor, further cause the computing device to:

generate, by the generator and based on training data comprising conversation data, initial autoregression data;

generate, by the generator and based on a set of teacher forcing samples, initial teacher forcing data; and determine, by the at least one discriminator and based on the initial autoregression data and the initial teacher forcing data, a discriminator accuracy.

15. The computing device of claim 11, wherein the instructions, when read by the processor, further cause the computing device to:

train the at least one discriminator after determining that a discriminator accuracy is below a discriminator threshold value, wherein the discriminator accuracy is determined by the at least one discriminator and based on an initial autoregression data and an initial teacher forcing data;

retrain the generator using a teacher forcing loss function of the generator after determining that the discriminator accuracy is below a generator threshold value;

retrain the generator using the teacher forcing loss function and an autoregressive loss function after determining that the discriminator accuracy is above the generator threshold value; and store a trained generative adversarial network.

16. The computing device of claim 11, wherein the instructions, when read by the processor, further cause the computing device to:

determine, by the at least one discriminator, a discriminator score for each response in the plurality of responses indicating a statistical similarity between the response and an anticipated ground truth response to the communication data; and rank the plurality of the responses further based on the discriminator score for each response in the plurality of responses.

17. The computing device of claim 11, wherein the instructions, when read by the processor, further cause the computing device to:

determine, by the at least one discriminator, a discriminator score for each response in the plurality of responses indicating a probability that the response is a ground truth response to a current prompt indicated in the communication data; and rank the plurality of the responses further based on the discriminator score for each response in the plurality of responses.

18. A non-transitory machine-readable medium storing instructions that, when executed by one or more processors, cause the one or more processors to perform steps comprising:

receiving communication data comprising a plurality of dialog sequences;

generating, by a generator of a generative adversarial network and based on context embedding and word embedding of the communication data, a plurality of responses, wherein each response in the plurality of responses comprises at least one keyword selected based on a maximum likelihood estimation of the at least one keyword in the communication data;

ranking, by at least one discriminator of the generative adversarial network and based on the context embedding and the word embedding, the plurality of responses;

selecting, by the at least one discriminator, an optimal response from among the ranked plurality of responses; and transmitting the optimal response.

19. The non-transitory machine-readable medium of claim 18, wherein the instructions that, when executed by one or more processors, further cause the one or more processors to perform steps comprising:

generating, by the generator and based on training data comprising conversation data, initial autoregression data;

generating, by the generator and based on a set of teacher forcing samples, initial teacher forcing data;

determining, by the at least one discriminator and based on the initial autoregression data and the initial teacher forcing data, a discriminator accuracy;

training the at least one discriminator after determining that the discriminator accuracy is below a discriminator threshold value;

retraining the generator using a teacher forcing loss function of the generator after determining that the discriminator accuracy is below a generator threshold value;

retraining the generator using the teacher forcing loss function and an autoregressive loss function after determining that the discriminator accuracy is above the generator threshold value; and storing a trained generative adversarial network.

20. The non-transitory machine-readable medium of claim 18, wherein the generator comprises hierarchical recurrent encoder-decoder network, and wherein the at least one discriminator comprises a convolutional neural network, or a recurrent neural network.

* * * * *